United States Patent
Orr et al.

(10) Patent No.: US 6,438,689 B1
(45) Date of Patent: Aug. 20, 2002

(54) REMOTE REBOOT OF HUNG SYSTEMS IN A DATA PROCESSING SYSTEM

(75) Inventors: Francis Martin Orr, Greenock; Roger Timothy Wood, Largs, both of (GB)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/371,299

(22) Filed: Aug. 10, 1999

(30) Foreign Application Priority Data

Aug. 22, 1998 (GB) .............................................. 9818270

(51) Int. Cl.$^7$ .............................................. G06F 9/445
(52) U.S. Cl. ......................................................... 713/2
(58) Field of Search ................................ 713/1, 2, 100; 710/8, 10

(56) References Cited

U.S. PATENT DOCUMENTS 5,471,674 A * 11/1995 Stewart et al. .................. 713/2
5,815,706 A * 9/1998 Stewart et al. .................. 713/2

FOREIGN PATENT DOCUMENTS

EP 0 464 987 1/1992

* cited by examiner

Primary Examiner—Thomas M. Heckler
(74) Attorney, Agent, or Firm—J. Bruce Schelkopf

(57) ABSTRACT

A data processing system includes a bus network interconnecting a data processor and one or more adapter cards, and providing for the data processor to bypass initialization of the adapter cards in response to a user indication entered prior to the initialization. This allows the system to be booted even in the event of an adapter card failure which causes the system to hang during initialization. The data processing system also enters a setup routine allowing the user to disable one or more of the adapter cards. The user indication may be entered at a remote computer where the data processing system is connected as a client computer to a server computer system by a network.

12 Claims, 3 Drawing Sheets

REMOTE REBOOT OF HUNG SYSTEMS IN A DATA PROCESSING SYSTEM

FIELD OF THE INVENTION

The present invention relates to remote reboot of systems in a data processing network, in particular to rebooting remote systems where an adapter card is preventing the system from booting satisfactorily and local intervention is required.

BACKGROUND OF THE INVENTION

In a typical data processing network environment, multiple client computer systems(clients) are connected to one or more server computer systems (servers). In one common arrangement, each client system includes an operating system, and optionally other software, stored on a mass storage device such as a hard disk drive within the client. On power-up or reboot, the client boots from the hard disk drive without reference to the server computer. Once operational and connected to the network, the client may choose to access and use programs or data resident on mass storage in the server.

It is becoming increasingly prevalent for servers to be controlled remotely, including restart of the server when a problem has occurred. However if an adapter card, such as an adapter card attached to the processor through a PCI (Peripheral Component Interconnect) bus, has a serious problem it can prevent the system from booting and local intervention at the server is required. The server is then not available to respond to requests from clients until the problem has been diagnosed and repaired. If the problem has been caused by an adapter card, then the failing adapter card needs to be removed from the server. If the server can function without the adapter card, then the server can be powered up and should function. If the server cannot function without the adapter card, then a replacement adapter card must be inserted into the server before it can be powered up. In a similar manner, clients may be controlled remotely.

In a prior art server, adapter cards are initialized prior to checking if the user wishes to enter a setup program. If a failing adapter card causes the server to hang and thus not be usable, then the user will not have the opportunity to run a setup program to disable the failing adapter card and allow the system to again be useable.

European Patent Application 0 464 987 having an effective filing date of Apr. 17, 1991 discloses a system which includes a plurality of expansion connectors for receiving adapter cards. A non-volatile memory stores programmable option select (POS) data that is stored when the system is configured. A Power On Self Test (POST) operation is performed during which adapters are checked to determine if any have been added, moved or removed, since a previous system configuration. If any have been so altered, the system can be placed in operation with all adapters enabled except for those which were altered.

It would be desirable to provide a system in which the user is able to indicate that he/she wishes to run a setup program, prior to initialization of adapter cards, which may cause the system to hang.

SUMMARY OF THE INVENTION

Accordingly, the invention provides a data processing system including a bus network interconnecting a data processor and one or more adapter cards and means being provided for causing the data processor to bypass initialization of at least one of said adapter cards in response to a user indication entered prior to said initialization. This allows the user to bring up a system which would otherwise hang during adapter card initialization because of a failing adapter card. The user may be at the same location as the data processing system or the user may be remote from the data processing system.

Preferably, the data processing system further includes means for causing the data processor to receive an indication from the user as to whether at least one of said adapter cards is to be disabled. This allows the user, having skipped the initialization routine which would cause the system to hang, to disable that failing adapter card or cards so that the system may be restarted without the system hanging.

Further preferably, the data processing system further includes means for causing the data processor to receive an indication from the user as to whether at least one of said adapter cards which is disabled is to be enabled for operation. This allows the system to have a second adapter card capable of performing the functions of the first adapter card installed in the system, but disabled. After failure of the first adapter card and it being disabled, the second adapter card may be enabled, thus allowing the machine to function normally with no loss of functionality.

In a preferred embodiment, the user indication is the depression of a pre-determined combination of one of more keys on a keyboard. Such a technique does not require any additional hardware to be used in the system.

In an embodiment, the data processing system is a client computer system connected to a server computer system and an indication entered by a user is entered at the server computer system. In another embodiment, the data processing system is a server computer system connected to a client computer system and an indication entered by a user is entered at the client computer system. This allows a remote user to bring up a system which would otherwise hang during adapter card initialization because of a failing adapter card. The need for the remote user to visit the location of the client computer system or the server computer system is removed.

The invention also provides a method of operating a data processing system having a bus network interconnecting a data processor and one or more adapter cards, the method comprising the steps of causing the data processor to bypass initialization of at least one of said adapter cards in response to a user indication entered prior to an initialization.

BRIEF DESCRIPTION OF THE DRAWINGS

A preferred embodiment of the present invention will now be described, by way of example only, with reference to the accompanying drawings in which.

DETAILED DESCRIPTION OF THE INVENTION

Figure 1:
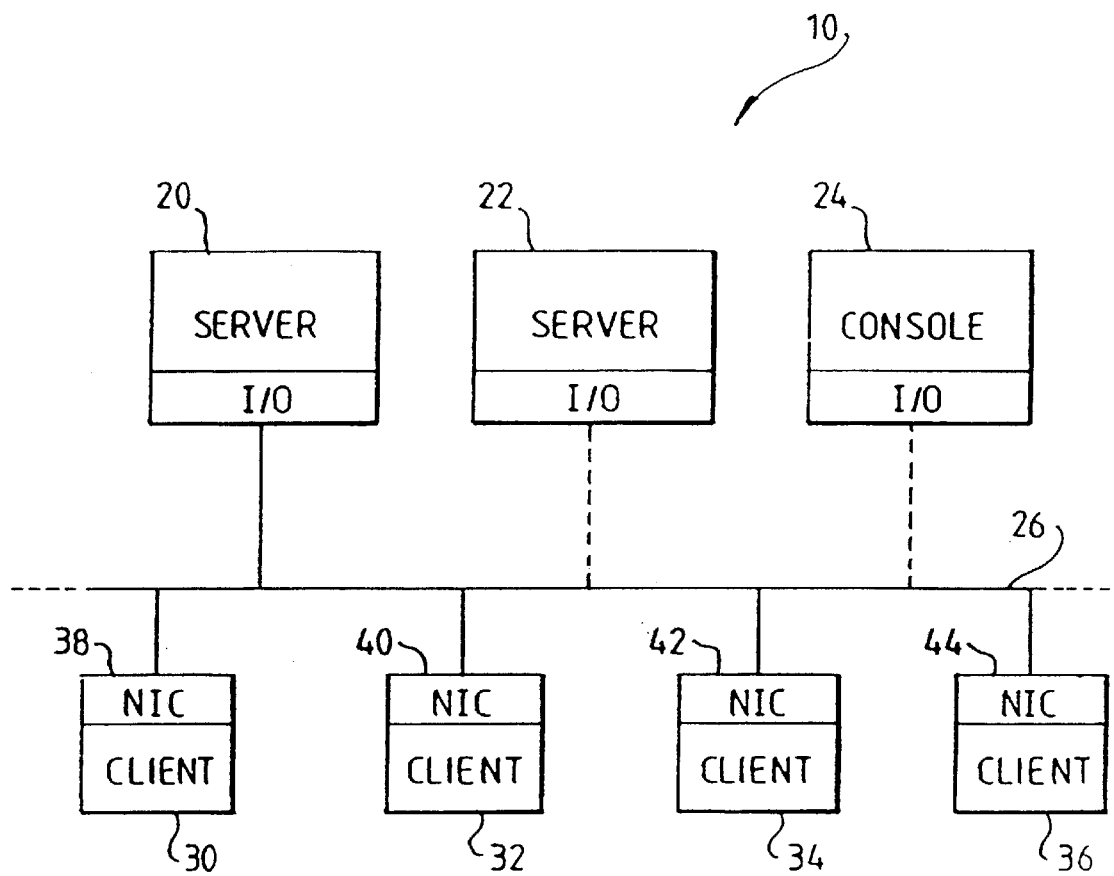
FIG. 1 is a schematic representation of a prior art computer network in which the preferred embodiment of the present invention is practiced.

Referring firstly to FIG. 1, there is shown, in schematic form, a local area network (LAN) 10 in which a preferred embodiment of the invention is implemented. The network of FIG. 1 may be configured as an Ethernet or Token Ring local area network or other arrangement. The network includes a server computer system 20 (which in the present embodiment may be an IBM PC Server 330 computer system) connected for communication by a link 26, in a loop configuration, with a plurality of client computer systems 30, 32, 34 and 36. The client computer systems may be personal computers based on the Intel X86 family of microprocessors or other forms of computer system including the Network Station from IBM. Each client system includes a LAN adapter card or network interface card (NIC) 38, 40, 42 and 44 to provide communication with the server computer over link 26.

Optionally, the network includes one or more further server systems 22 and a console computer system 24 through which the network administrator controls the network. The console system is generally similar to a client system except that it includes mass storage and further is arranged to provide the network administrator with certain privileges, not available to a client user, which allows him/her to control the network.

Control of resources on the network, including communication between server and clients, is effected by means of a network operating system (NOS), for example, OS/2 LAN Server from IBM Corporation, having a 'server' component which executes on the main processor(s) of the server computer system and a corresponding 'requester' component which executes on the main processor of each client computer system. Other suitable network operating systems include Netware from Novell Inc and OS/2 WARP server from IBM Corporation.

Figure 2:
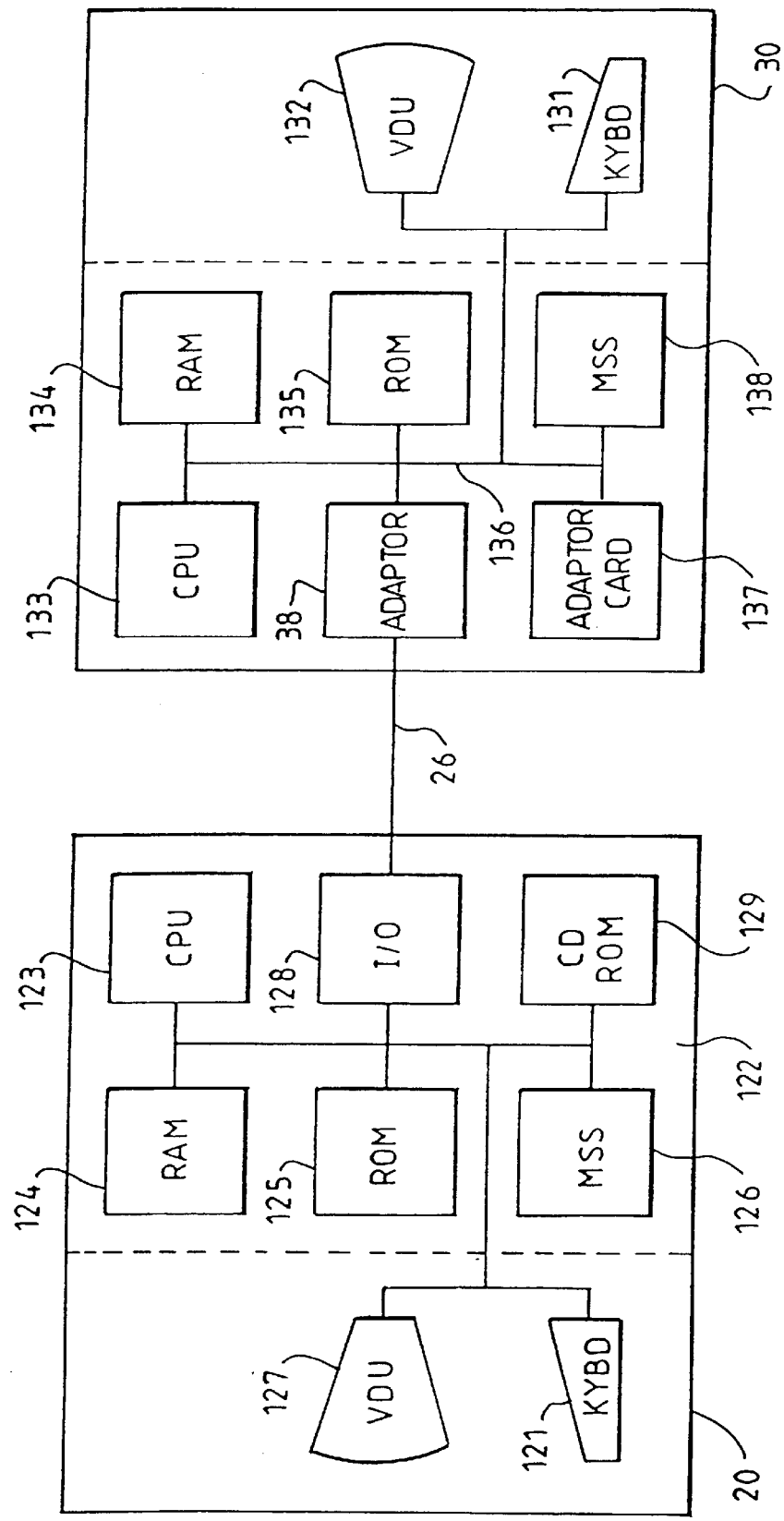
FIG. 2 is a block diagram representation of a prior art client computer system connected to a server computer system in the network of FIG. 1.

FIG. 2 is a simplified block diagram showing the connection of server computer system 20 to client system 30 over communication link 26. As is normal, the client system 30, constituted in the present embodiment by a personal computer, includes a keyboard 131 and a display 132 operating under the control of control logic in the form of main CPU 133 which is connected by a system bus 136 to system memory (RAM) 134 and non-volatile memory (ROM) 135, in which is stored system BIOS including POST code. The client system further includes a network adapter card 38 which, in the present embodiment, may be either an ethernet or token-ring adapter card. This adapter card includes non-volatile memory in the form of ROM in which is stored code employed in providing communication between the client and server. The client system further includes mass storage 138 in the form of a magnetic disk drive (hard file) for storing operating system and other software. The client may further include (not illustrated) a diskette drive, CD-ROM drive or similar.

The server computer system of FIG. 2 includes a keyboard 121 attached to a system unit 122 including a main CPU 123, system RAM 124, system ROM 125 and mass storage capability 126, typically in the form of multiple magnetic disk drives constituted in a RAID (redundant array of independent disks) arrangement. Stored on the disk drives are software images comprising operating system software and optionally application software for downloading to the client systems. The server system may optionally include a display 127 (if the network administrator requires direct interaction with the server system) and other typical storage devices such as a diskette drive (not illustrated) and CD-ROM drive 129. Communication over the link 26 is provided by input/output logic 128 which may take the form of an adapter card (which may be the same type adapter card employed in the client system).

The present embodiment of the invention provides a method by which a user, either local or remote, can cause a system to start up and to run a setup program in situations where a failing adapter card is causing the system to hang and thus not be usable, and to disable the adapter card causing the hang. Such system hangs may, for example, be caused by hardware failures which cause initialization code located on the adapter to loop forever or by resource conflicts with the system or with other adapters.

Figure 3:
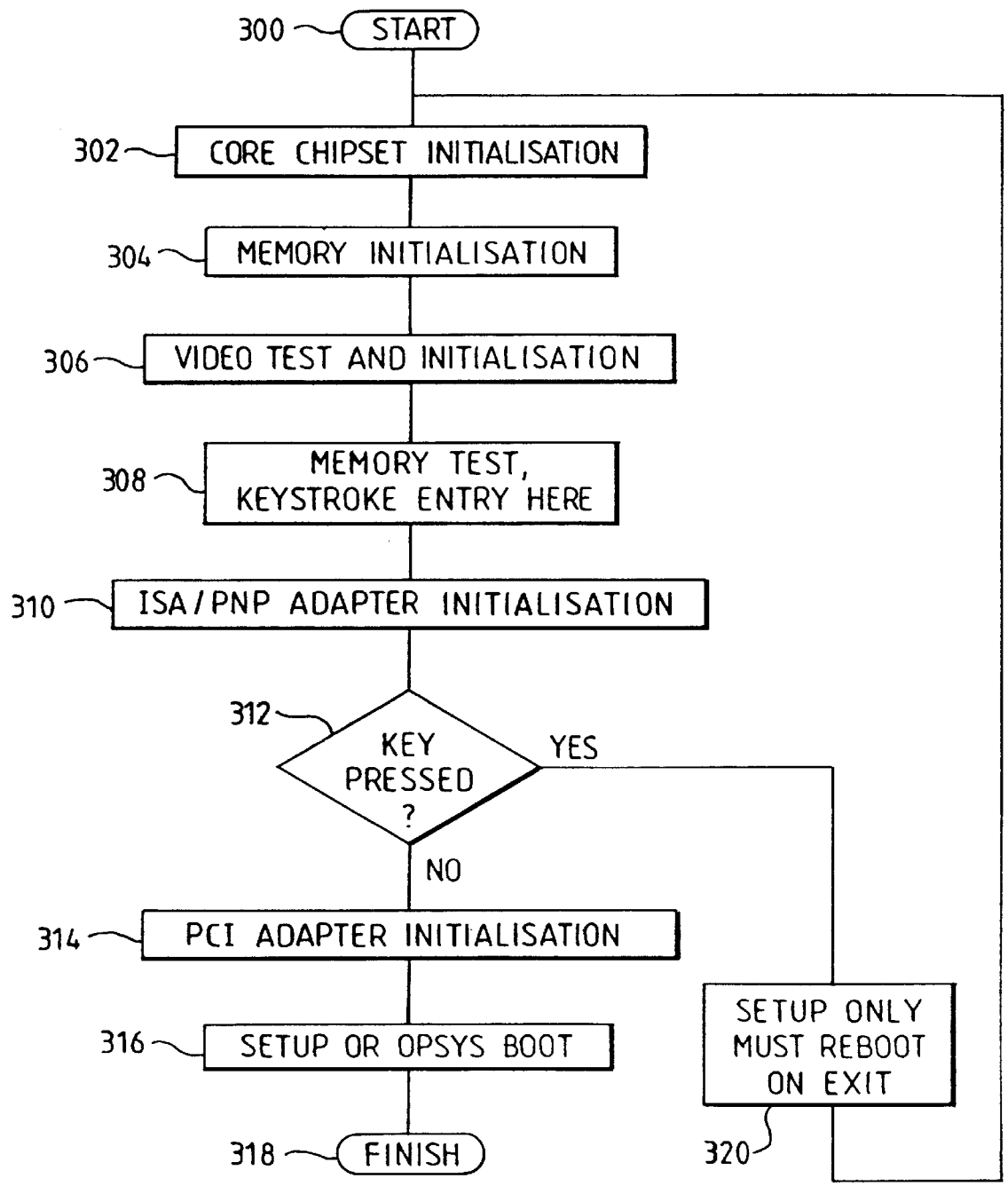
FIG. 3 is a flow chart of the initialization routines used in an embodiment of the present invention.

FIG. 3 is a flow chart of the initialization routines used in an embodiment of the present invention, implemented in a client system. The initialization routine is entered at step 300. At step 302, the core chipset is initialized. The core chipset is the CPU (133 in FIG. 2) and the chips which support the CPU in controlling the memory (134, 135 in FIG. 2) and the bus (136 in FIG. 2). The core chipset may include other chips which form the core of the system. At step 304, the memory in the system is initialized. At step 306, the video circuitry (represented by VDU 132 in FIG. 2) is tested and then initialized so as to provide the correct timing signals to the display attached to the client system 30. At step 308, the memory (134 and 135 in FIG. 2) is tested and typically, an indication is provided to the user on the display screen of the state of progress of the memory test. During the step of testing the memory, a keystroke may be entered by the user to indicate that the user wishes to bypass the initialization of adapters and enter a system setup program. Following the memory test, at step 310, ISA (Industry Standard Architecture) bus and Plug n'Play adapters are initialized. At step 312, a check is made to see if the user entered the particular keystroke or combination of keystrokes that indicates that the user wishes to bypass the initialization of PCI bus adapters and enter a system setup program.

If the particular keystroke or combination of keystrokes was not entered, any PCI bus adapters present in the system are initialized at step 314. At step 316, the operating system is booted or alternatively setup is entered through a "normal" keystroke or combination of keystrokes allocated for that function. At step 318, the initialization routine ends. The advantage of entry to the setup routine through the "special" keystroke or combination of keystrokes at step 312 compared to entering the setup program through the "normal" keystroke or combination of keystrokes at step 316 is that since the setup program is entered prior to the initialization of PCI adapters at step 314, then PCI adapter hangs do not prevent entry to the setup program.

A system setup program provides, via a series of screens, options that allow a user to modify various aspects of the system behavior both during POST and during subsequent operation. Items such as setting of passwords, boot sequence, date and time can be modified by a user in the system setup program as well as parameters relating to the chipset and the system performance. The system setup program also gives the user information on system resources, such as memory, I/O devices and their resource usage and allows the user to query the system error logs. In the system setup program the failing adapter may be disabled, thus allowing normal system bring-up on subsequent boots. An adapter is disabled via a setup window. This window lists all the adapters installed in the system, together with a user choice which can be toggled, using a keyboard, between enabled and disabled. A disabled adapter has its unique adapter select line blocked, thus preventing it from responding to configuration cycles on the PCI bus. This means that the adapter cannot be seen by the main CPU and thus will take no part in the system boot. Once the setup program has been completed, the client system 30 must be rebooted on exit, so processing returns to step 302 to restart the initialization process.

A second/backup adapter, if installed, can be enabled, allowing the system to operate normally until the failing adapter could be removed when the server system or the client system is being maintained.

Another advantage of the invention is that a much faster boot time can be achieved when the object of the boot is to enter setup and change some configuration parameters.

Although the present invention and its advantages have been described in detail, it should be understood that various changes, substitutions and alterations can be made herein without departing from the spirit and scope of the invention as defined by the appended claims.

What is claimed:

1. A data processing system, comprising:
   a bus network interconnecting a data processor and one or more adapter cards, and
   means for causing the data processor to bypass initialization of at least one of the adapter cards in response to a user indication entered prior to the initialization of the data processing system.

2. The data processing system as defined in claim 1, further comprising means for causing the data processor to receive an indication from the user as to whether at least one of the adapter cards is to be disabled.

3. The data processing system as defined in claim 2, further comprising means for causing the data processor to receive an indication from the user as to whether at least one of the adapter cards which is disabled is to be enabled for operation.

4. The data processing system as defined in claim 1, wherein the user indication is the depression of a pre-determined combination of one of more keys on a keyboard.

5. The data processing system as defined in claim 1, wherein the data processing system is a client computer system connected to a server computer system and the indication entered by a user is entered at the server computer system.

6. The data processing system as defined in claim 1, wherein the data processing system is a server computer system connected to a client computer system and the indication entered by a user is entered at the client computer system.

7. A method of operating a data processing system having a bus network interconnecting a data processor and one or more adapter cards, the method comprising the steps of:
   receiving a user indication regarding enablement of a disabled adapter card; and
   causing the data processor to bypass initialization of at least one of the adapter cards in response to the user indication entered prior to the initialization.

8. The method as defined in claim 7, further comprising the step of for causing the data processor to receive an indication from the user as to whether at least one of the adapter cards is to be disabled.

9. The method as defined in claim 8, further comprising the step of causing the data processor to receive an indication from the user as to whether at least one of the adapter cards which is disabled is to be enabled for operation.

10. The method as defined in claim 7, wherein the user indication is the depression of a pre-determined combination of one of more keys on a keyboard.

11. The method as defined in claim 7, wherein the data processing system is a client computer system connected to a server computer system and the indication entered by a user is entered at the server computer system.

12. The method as defined in claim 7, wherein the data processing system is a server computer system connected to a client computer system and the indication entered by a user is entered at the client computer system.

\* \* \* \* \*